United States Patent [19]
Berson

[11] Patent Number: 5,861,618
[45] Date of Patent: *Jan. 19, 1999

[54] SYSTEM AND METHOD OF IMPROVING THE SIGNAL TO NOISE RATIO OF BAR CODE AND INDICIA SCANNERS THAT UTILIZE FLUORESCENT INKS

[75] Inventor: William Berson, Weston, Conn.

[73] Assignee: Pitney Bowes, Inc., Stamford, Conn.

[*] Notice: The term of this patent shall not extend beyond the expiration date of Pat. No. 5,502,304.

[21] Appl. No.: 553,730

[22] Filed: Oct. 23, 1995

[51] Int. Cl.$^6$ .................................................. G06K 7/12
[52] U.S. Cl. ............................................. 235/468; 235/491
[58] Field of Search .................................... 235/468, 491

[56] References Cited

U.S. PATENT DOCUMENTS

| | | | |
|---|---|---|---|
| 4,480,177 | 10/1984 | Allen | 235/468 |
| 4,983,817 | 1/1991 | Dolash et al. | 235/462 |
| 5,109,153 | 4/1992 | Johnsen et al. | 235/468 |
| 5,331,140 | 7/1994 | Stephany | 235/468 |
| 5,367,148 | 11/1994 | Storch et al. | 235/375 |
| 5,502,304 | 3/1996 | Berson et al. | 235/468 |
| 5,514,860 | 5/1996 | Berson | 235/468 |
| 5,525,798 | 6/1996 | Berson et al. | 235/468 |
| 5,542,971 | 8/1996 | Auslander et al. | 106/21 A |
| 5,554,842 | 9/1996 | Connell et al. | 235/491 |

FOREIGN PATENT DOCUMENTS

| | | | |
|---|---|---|---|
| 0-149-578 | 8/1994 | Japan | G06K 19/06 |
| 2-232-926 | 1/1991 | United Kingdom | 283/81 |

OTHER PUBLICATIONS

Hecht: Optics; Second Edition 1987 p. 553.

Primary Examiner—Anita Pellman Gross
Assistant Examiner—Douglas X. Rodriguez
Attorney, Agent, or Firm—Ronald Reichman; Melvin J. Scolnick

[57] ABSTRACT

A bar code and/or indicia scanning method that is able to determine what light was emitted from an upper layer invisible bar code and/or upper layer invisible indicia and what light was reflected back to the detector from a visible lower layer bar code and/or visible lower layer indicia. The detecting is "blind" to the spectra of the excitation source. Rather than differentiate between the exciter and emitter in the spectral domain, this invention differentiates between the exciter and the emitter in the time domain. The latency and persistence of the phosphorescent pigments of the invisible ink are used so that the detected signal is only the signal emitted by the upper layer invisible ink after the light source is turned off. Illumination and detection are synchronized to reduce the effects of reflection to zero so that the detector need not be chosen to be blind to the exciter. The foregoing is particularly suited to LED and laser illumination where the light source may be easily turned on and off.

16 Claims, 3 Drawing Sheets

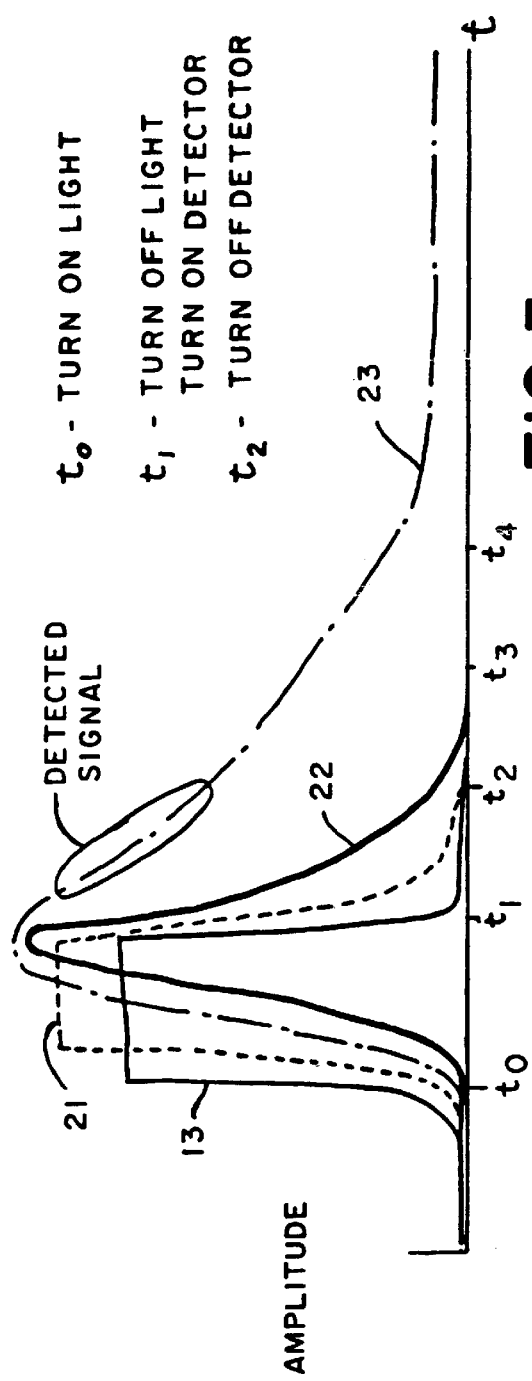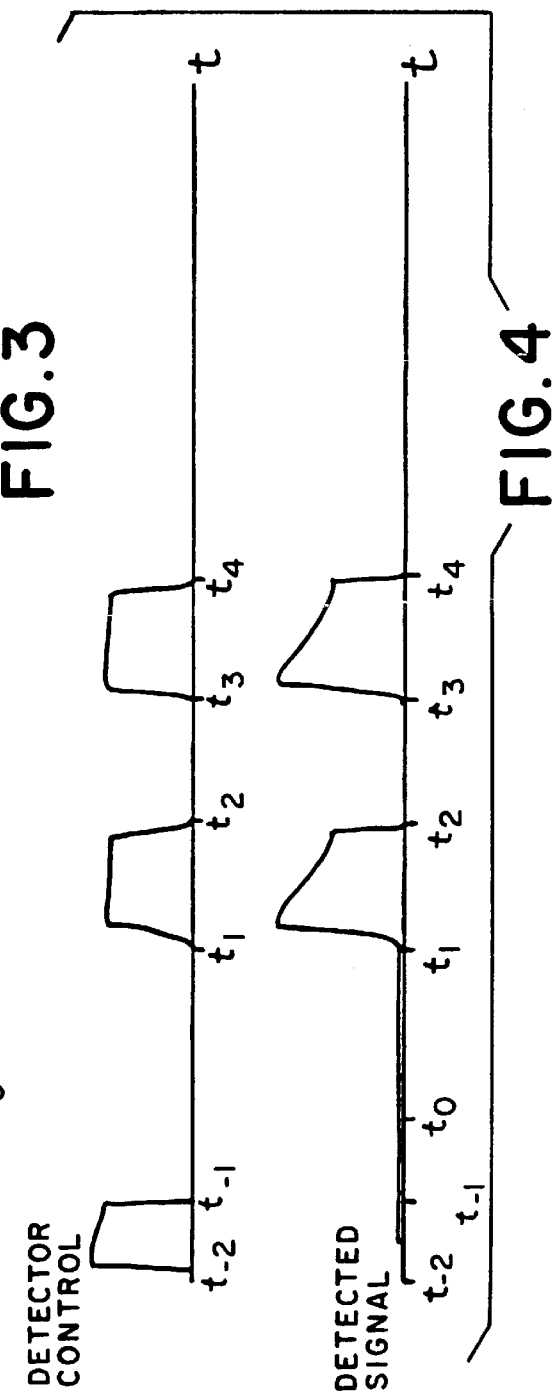

SYSTEM AND METHOD OF IMPROVING THE SIGNAL TO NOISE RATIO OF BAR CODE AND INDICIA SCANNERS THAT UTILIZE FLUORESCENT INKS

FIELD OF THE INVENTION

The invention relates generally to the field of detecting information that was printed on documents and more particularly to detecting bar codes and indicia that have been printed on documents with fluorescent inks.

BACKGROUND OF THE INVENTION

Bar codes have been used in a wide variety of applications as a source for information. Typically bar codes are used at a point-of-sale terminal in merchandising for pricing and inventory control. Bar codes are also used in controlling personnel access systems, mailing systems, and in manufacturing for work-in process and inventory control systems, etc. The bar codes themselves represent alphanumeric characters by series of adjacent stripes of various widths, i.e. the universal product code.

A bar code is a set of binary numbers. It consists of black bars and white spaces. A wide black bar space signifies a one and a thin black bar or space signifies a zero. The binary numbers stand for decimal numbers or letters. There are several different kinds of bar codes. In each one, a number, letter or other character is formed by a certain number or bars and spaces.

Bar code reading systems or scanners have been developed to read bar codes. The bar code may be read by having a light beam translated across the bar code and a portion of the light illuminating the bar code is reflected and collected by a scanner. The intensity of the reflected light is proportional to the reflectance of the area illuminated by the light beam. Thus, the scanners read the difference between the light and dark bars by reading the absences of reflected light This light is converted into an electric current signal and then the signal is decoded.

Bar codes have been affixed to many different types of documents, so that they may be read by a machine, thereby reducing labor costs. Documents that include bar codes and/or indicia have been issued by governmental agencies, financial institutions, brokerage houses, etc., that authorize the holder of such documents to perform authorized tasks or grant rights to the holder of such a document. Examples of such documents are drivers licenses, entry access badges, identification cards, etc.

Bar codes and indicia have been printed on documents with transparent or invisible inks in order to place additional information on the documents and/or to make it more difficult to counterfeit the document. A lower layer bar code and/or lower layer indicia may be printed on a document with a fluorescent ink or a conventional ink and a upper layer bar code and/or upper layer indicia may be printed on top of the lower layer bar code and/or lower layer indicia with a invisible fluorescent ink or a conventional ink. The lower layer bar code and/or indicia is read during one period of time and the upper layer bar code and/or indicia is read during another period of time.

One of the problems encountered by the prior art is that the background printing effects the signal to noise ratio of the detection of the invisible printing of the upper layer bar code and/or indicia. The reason for the above is that the detectors that are utilized to detect the emitted signal from the invisible ink of the upper layer bar code and/or upper indicia detect spurious reflections of the illuminated light source. Thus, the detectors have difficulty in determining what light was emitted from the upper layer invisible bar code and/or upper layer invisible indicia and what light was reflected back to the detector from the visible lower layer bar code and/or visible lower layer indicia.

Another problem encountered by the prior art is that paper as well as conventional color inks often contain fluorescent brightners which when illuminated by an excitation source for the purpose of reading the printed material fluoresce and obscure the signal from the invisible ink signal. Thus, it is difficult to read the upper layer invisible bar code and/or upper layer invisible indicia and the visible lower layer bar code and/or visible lower layer indicia, since the signal coming from the upper layer invisible ink is mixed with the background fluorescent signal.

SUMMARY OF THE INVENTION

This invention overcomes the disadvantages of the prior art by providing a bar code and/or indicia scanner detector that is able to determine what light was emitted from the upper layer invisible bar code and/or upper layer invisible indicia and what light was reflected back to the detector from the visible lower layer bar code and/or visible lower layer indicia. The detector and source are chosen such that the scanner detector is "blind" to the spectra of the excitation source. Rather than differentiate between the exciter and emitter in the spectral domain, this invention differentiates between the exciter and the emitter in the time domain. The latency and persistence of the phosphorescent pigments of the invisible ink are used so that the detected signal is only the signal emitted by the upper layer invisible ink after the light source is turned off. Illumination and detection are synchronized to reduce the effects of reflection to zero so that the detector need not be chosen to be blind to the exciter. The foregoing is particularly suited to LED and laser illumination where the light source may be easily and instantaneously strobed.

This invention also makes it more difficult to counterfeit informational material that is part of, affixed to or printed on an object. The foregoing may be accomplished by: printing alphanumeric material on an object with a normal colored ink: printing a first portion of a symbol and/or code on an object with a fluorescent ink; printing a second portion of a symbol and/or code on an object with a phosphorescent ink; and reading the portions of the object that were printed with different inks. The reason why the above is true is that the informational material is more difficult to counterfeit. The human eye is unable to distinguish between informational material printed with a fluorescent ink and informational material printed with phosphorescent ink.

BRIEF DESCRIPTION OF THE DRAWING

FIG. 3 is a graph of the amplitude of the visible and invisible inks vs. the time detector 15 and light source 13 is turned on and off; and FIG. 4 is a timing diagram of the time in which detector 15 is turned on and off and the detected signals are detected.

DETAILED DESCRIPTION OF THE PREFERRED EMBODIMENT

Figure 1:
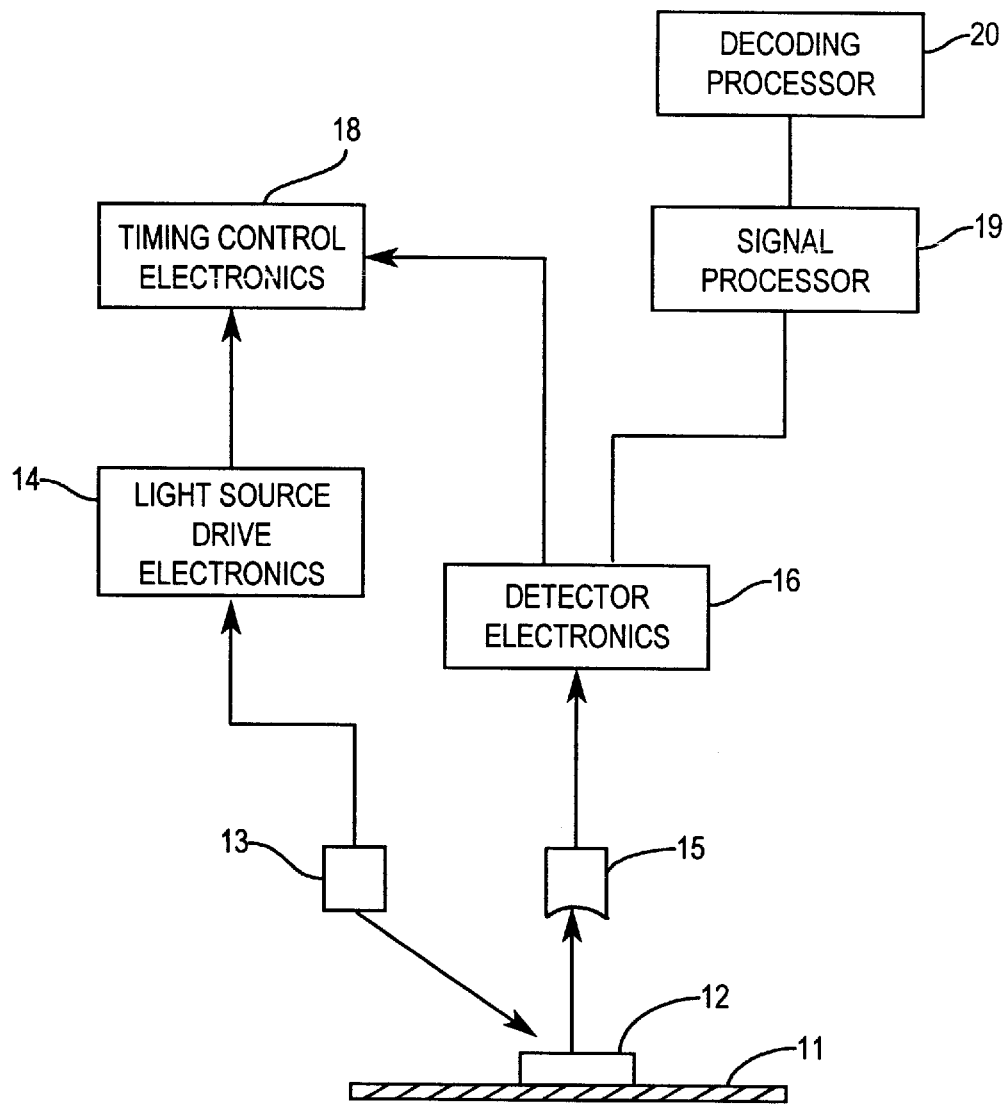
FIG. 1 is a block diagram of the apparatus of this invention.

Referring now to the drawings in detail and more particularly to FIG. 1, the reference character 11 represents a substrate that has informational material affixed thereto. The informational material was printed on substrate 11 with a phosphorescent ink 12. Phosphorescent inks containing 5% YPV-Ytterium phosphovanadate Europium doped Y (P,V) $O_4$ or 5% Ytterium OxySulfide Europeium doped $Y_2O_2$ S;Eu in water are examples of ink 12. Ink 12 is illuminated by a light source 13. Source 13 may be a lamp, light emitting diode, laser, or xenon flash lamp, etc. Light source 13 is coupled to light source drive electronics 14. Drive electronics 14 supplies power to excite light source 13 and source 13 when activated causes ink 12 to phosphoresce. Electronics 14 may be the MC105X130D driver manufactured by Motorola or the CZEU101 driver manufactured by Solitron. Detector 15 detects the light emitted by ink 12. Detector 15 may be a charged coupled device, phototransistor array or photomutlipier, etc. Detector 15 is coupled to detector electronics 16. Electronics 16 supplies power and proper electrical voltage for detector 15. Detector 15 may be the TC211 detector manufactured by Texas Instruments and detection electronics 16 may be the model no. SN28846DW CCD driver manufactured by Texas Instruments. Detection electronics 16 is coupled to timing control electronics 18 and signal processor 19. Timing control electronics 18 synchronizes drive electronics 14 with detection electronics 16 so that electronics 16 will detect light emitted from ink 12 when light source 13 is turned off. Timing control electronics 18 may be the 80486 microprocessor manufactured by Intel. Signal processor 19 is coupled to decoding processor 20. Signal processor 19 extracts the signal detected by detector 15 and decoding processor 20 decodes the extracted signal. Signal processor 19 may be the 80386 manufactured by Intel and decoding processor 20 may be the model no. HBCR 2210 or the HBCR221 decoding processor manufactured by Hewlett Packard.

Figure 2:
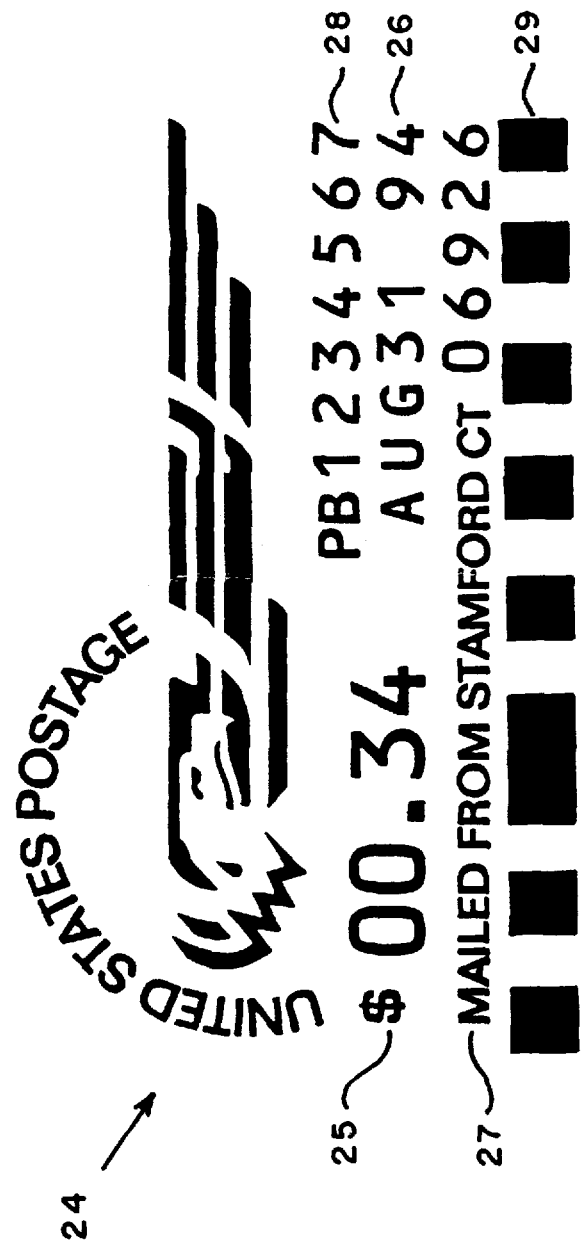
FIG. 2 is a drawing of informational material that is printed with a normal colored ink, i.e., black ink, a fluorescent ink and a phosphorescent ink.

FIG. 2 is a drawing of informational material that is printed with a normal colored ink, a fluorescent ink and a phosphorescent ink. The informational material may be in the form of postal indicia 24. Postal indicia 24 contains a dollar amount 25, the date 26 that the postal indicia was affixed to a mail piece, the place the mail piece was mailed from 27, the postal meter serial number 16, and a bar code 29. Portions of indicia 24 are printed with a colored ink. Other portions of indicia 24 are printed with a fluorescent ink and the remaining portions of indicia 24 are printed with a phosphorescent ink.

FIG. 3 is a graph of the amplitude of the visible ink signal 21, the invisible fluorescent ink signal 22 and the invisible phosphorescent ink signal 23 vs. the time detector 15 and light source 13 of FIG. 1 are turned on and off. The invisible and visible ink signals will be able to be detected by detector 15 when they have a amplitude that is able to be detected by detector 15 and the invisible and visible ink signals will not be able to be detected by detector 15 when they have a amplitude that is not able to be detected by detector 15. A background check will normally be performed on detector 15 (FIG. 4) during the interval of time between $t_{-1}$ and $t_{-2}$. Light source 13 will be turned on and have its maximum amplitude at time to and light source 13 will be turned off and detector 15 will be looking at the emitted signal at time $t_1$. Detector 15 will not be looking for the emitted signal at time $t_2$. Thus, during the interval of time between $t_1$ and $t_2$, the invisible ink signals 22 and 23 will be able to be detected by detector 15 and the visible ink signal 21 will not be able to be detected by detector 15. If detector 15 is looking for a emitted signal during the interval of time between $t_3$ and $t_4$, detector 15 will only be able to detect the phosphorescent ink signal 23.

The above specification describes a new and improved method for differentiating between signals radiated or emitted by normal visible inks, invisible fluorescent inks and invisible phosphorescent inks. It is realized that the above description may indicate to those skilled in the art additional ways in which the principles of this invention may be used without departing from the spirit. It is, therefore, intended that this invention be limited only by the scope of the appended claims.

What is claimed is:

1. A method for differentiating between signals radiated or emitted by one or more inks that are affixed to or are printed on an object in order to supply information to an observer and appear to the human eye to be a single image, said method includes the steps of:
    a) supplying light to one or more inks, wherein at least one of the inks is phosphorescent and is invisible to the human eye;
    b) removing the light supplied in step a);
    c) synchronizing the detection of the light emitted or radiated by the ink with the removal of the light emitted or radiated from the inks; and
    d) detecting each of the signals emitted or radiated by the inks during different time intervals resulting from the latency and persistence of phosphorescent materials in the inks.

2. The method of claim 1, wherein the lighting step further includes:
    lighting matter produced by a fluorescent ink; and
    lighting matter produced by the phosphorescent ink.

3. The method of claim 2, wherein the lighting step further includes:
    lighting matter produced by a normal ink.

4. The method of claim 1, wherein the lighting step further includes:
    lighting matter produced by a normal ink; and
    lighting matter produced by the phosphorescent ink.

5. The method of claim 4, wherein the lighting step further includes:
    lighting matter produced by a fluorescent ink.

6. The method of claim 1, wherein the lighting step further includes:
    lighting matter produced by a normal ink; and
    lighting matter produced by a fluorescent ink.

7. The method of claim 6, wherein the lighting step further includes:
    lighting matter produced by the phosphorescent ink.

8. The method of claim 1, further including the step of:
    decoding the emitted and/or radiated signal in order to determine what information is being supplied by the inks.

9. A method for detecting a code and/or indicia that are affixed to or are printed on an object in order to supply information to an observer, said method includes the steps of:
    turning on a light source to illuminate a code and/or indicia;
    turning off the light source that illuminated the code and/or indicia;
    synchronizing the turning off of the light source with the detection of the light emitted or radiated by the code and or indicia with the removal of the light; and
    detecting the code and/or indicia resulting from the latency and persistence of the code and/or indicia.

10. The method of claim 9, further including the step of: printing the code and/or indicia with a phosphorescent ink.

11. The method of claim 9, further including the step of: printing a portion of the code and/or indicia with a phosphorescent ink.

12. The method of claim 9, further including the step of:
 printing a portion of the code and/or indicia with a phosphorescent ink; and
 printing a portion of the code and/or indicia with a phosphorescent ink, normal visible ink, a invisible fluorescent ink, and a invisible phosphorescent.

13. The method of claim 9, further including the step of: printing a upper level code over a lower level code.

14. The method of claim 9, further including the step of: printing a upper level indicia over a lower level indicia.

15. The method of claim 9, further including the step of: printing a upper level code over a lower level indicia.

16. The method of claim 9, further including the step of: printing a upper level indicia over a lower level code.

* * * * *